No. 874,811. PATENTED DEC. 24, 1907.
G. A. WEIDELY.
MOTOR VEHICLE DRIVING GEAR.
APPLICATION FILED JUNE 1, 1907.
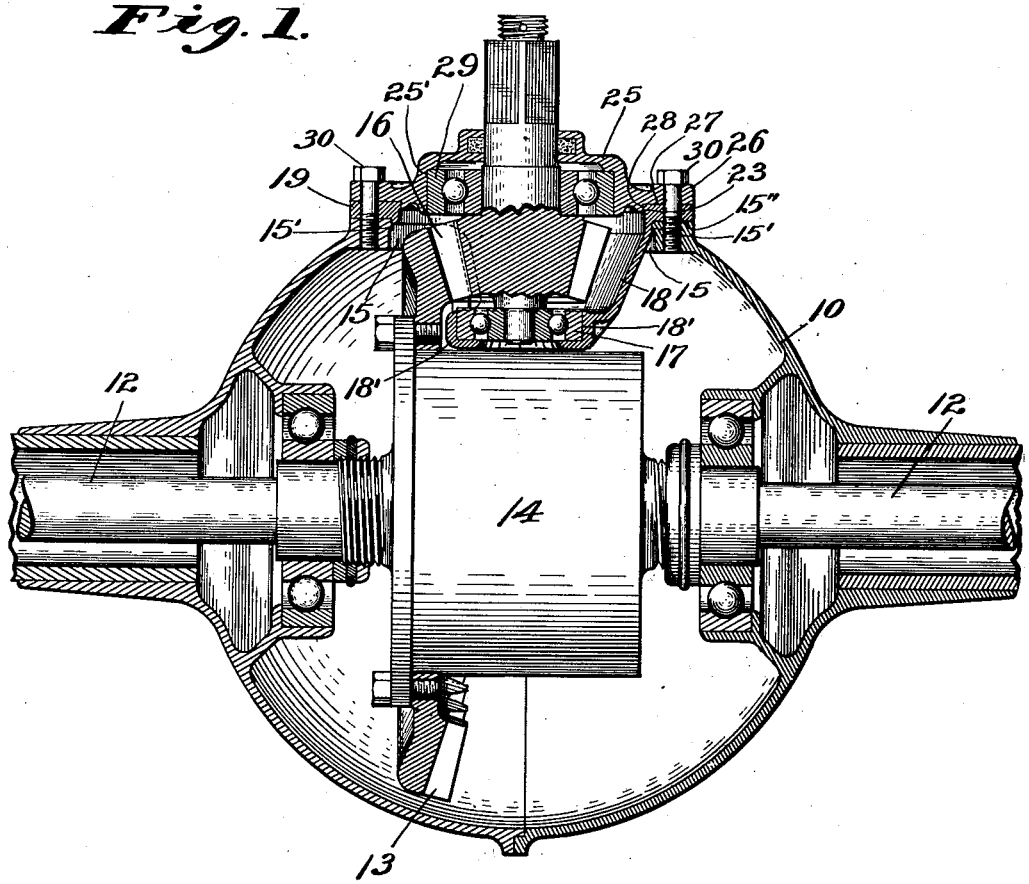
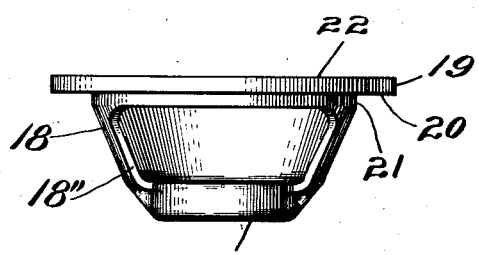
Witnesses
Frank A. Fahle
Thomas W. McMeans
Inventor
George A. Weidely
BY Bradford Hood
Attorneys

UNITED STATES PATENT OFFICE.

GEORGE A. WEIDELY, OF INDIANAPOLIS, INDIANA, ASSIGNOR OF ONE-HALF TO HAROLD O. SMITH, OF INDIANAPOLIS, INDIANA.

MOTOR-VEHICLE DRIVING-GEAR.

No. 874,811.   Specification of Letters Patent.   Patented Dec. 24, 1907.

Application filed June 1, 1907. Serial No. 376,825.

*To all whom it may concern:*

Be it known that I, GEORGE A. WEIDELY, a citizen of the United States, residing at Indianapolis, in the county of Marion and State of Indiana, have invented certain new and useful Improvements in Motor-Vehicle Driving-Gear, of which the following is a specification.

In that type of automobiles wherein the power is transmitted to the driving axles or shafts through the medium of a pair of gears, one carried by the compensator and the other connected by the driving shaft, difficulty has been experienced in providing an adequate bearing for the driving pinion and maintaining the bearings in proper alinement.

The object of my present invention is to produce a structure which may be easily manufactured without special and expensive tools, the construction being such that no difficulty will be experienced in obtaining and maintaining proper alinement of the bearings of the driving pinion, the construction being also such that the parts are readily interchangeable and readily accessible.

The accompanying drawings illustrate my invention, as applied to a rear axle structure, Figure 1 being an axial section of an embodiment of my invention and Fig. 2 an elevation of the supporting cup for the inner bearing.

In the drawings 10 indicates a tubular axle structure of any desired type and within which are mounted, in any desired manner, the driving shaft sections 12—12 to be driven by the driving gear 13 which, in many cases, as shown, forms the primary element of a compensating gear 14 which forms the connection between the two shaft sections 12—12.

The particular details of construction of the parts thus far described are not material to my present invention, as they may be of any desired suitable form, except that the casing 10, at a point adjacent the gear 13, is provided with an opening 15, preferably circular, which is finished at its outer end 15' and flanked by an annular finished surface 15", preferably parallel with the axes of shafts 12, although not necessarily so.

The gear 13 is driven by means of the driving pinion 16 which meshes therewith, and it has been heretofore proposed to provide for the shaft of this pinion a pair of bearings, one at the inner end and the other at the outer end, but, so far as I know, this inner bearing has heretofore been supported either in a member formed integral with the casing 10 or bolted to the inside thereof, thus requiring special tools for machined parts as well as being unsatisfactory because of the difficulty of obtaining proper alinement of this bearing with the outer bearing. In avoiding these difficulties, I have produced a structure wherein the position of the two bearings of the driving pinion 16 is determined by the same portion of the casing, in the following manner: The inner bearing 17 is supported in a cup 18 which, at its outer end, is provided with a radial flange 19. This flange is finished on its under surface 20, to fit surface 15" of casing 10, and immediately adjacent surface 20, the cup 18 is trued at 21 to fit snugly within the outer finished end 15' of the opening 15 of the casing 10. The outer face 22 of flange 19 is also finished parallel with face 20, and the interior of the cup, immediately adjacent surface 20, is also trued at 23 in perfect alinement with the cup 18 and portion 21. Mating with the cup member 18 is another bearing-cup member 25 which is also provided with a radial flange 26, the under surface 27 of which is finished to mate with surface 22 of the cup member 18, and immediately adjacent the surface 27 of cup member 25 is a trued portion 28 which is in alinement with the bearing cup 25' of the cup member 25. A suitable bearing 29, adapted to engage the outer end of the shaft of pinion 16, is mounted in cup 25'. Cup member 18 is provided at one side with an opening 18" to permit the entry of gear 13 in order to mesh with pinion 16.

It will be noticed that, by this construction, the cup-member 18 may be machined in an ordinary turret lathe and the bearing cup 18' and the surfaces 20, 21, 22 and 23 machined in perfect alinement, the work being accomplished by ordinary tools and without special difficulty. The cup member 25 may be similarly finished with the bearing cup 25' and surfaces 27 and 28 in perfect alinement. Surfaces 15' and 15" of casing 10 may also be readily and accurately finished so that when the parts are assembled together, as shown in Fig. 1, the bearings 17 and 29 necessarily come into perfect alinement. Bolts 30 may then be passed through the flanges 26 and 20 into the casing 10, thus holding all of the parts together firmly and in proper alinement, without probability of distortion.

It will be readily understood that the invention herein described and claimed is not limited to the rear axle structure of an automobile, but may as readily be applied to the jack-shaft in a machine of the side-chain-drive type.

I claim as my invention:

1. In an automobile, the combination, with an axle casing and a driving pinion, of an inner bearing and an outer bearing for said pinion, and supporting means for both of said bearings fitted upon the same portion of the axle casing.

2. In an automobile, the combination, with an axle casing having a shaft opening, of a bearing cup fitted to the casing in said opening and having a portion lying within the casing, a bearing mounted in said cup for the inner end of a driving pinion, a second bearing cup also fitted to the casing in said opening, a bearing in said second cup, and the driving pinion supported between said bearings.

3. In an automobile, the combination, with a supporting-structure having an opening, of a bearing cup fitted to said opening, a bearing carried by said cup, a second bearing cup fitted to the first cup, a bearing carried by said second cup in alinement with the first bearing, and a driving member journaled between said bearings.

4. In an automobile, the combination, with a supporting-structure having a finished opening, of a bearing cup fitted into said finished opening, a bearing carried by said cup, a second bearing cup fitted to the first cup, a bearing carried by said second cup in alinement with the first bearing and a driving member journaled between said bearings.

5. In an automobile, the combination with a hollow axle structure having a finished shaft opening, the shaft sections journaled therein, and the driving connection between said shaft sections comprising a driving gear, of a driving pinion meshing with said gear, and a pair of bearings for supporting the inner and outer ends of said driving pinion, a cup having a radial flange fitting the finished opening of the axle casing and supporting the inner bearing, a bearing cup having a radial flange fitted upon the flange of the first cup and supporting the outer bearing, and means for clamping the two bearing cups on to the casing.

6. A driving structure for automobiles comprising a pair of shaft sections, an intermediate driving connection between said shaft sections comprising a driving gear, a bearing-supporting structure associated with the shaft sections and having a finished opening adjacent the driving gear, a bearing cup having a radial flange fitted to said opening, a bearing supported by said cup, a second bearing cup having a radial flange fitted to the flange of the first cup, a bearing carried by said second cup, a driving pinion journaled between said bearings and meshing with the driving gear, and means for clamping the bearing cups upon the bearing-supporting structure.

7. A driving structure for automobiles comprising a pair of shaft sections, an intermediate driving connection between said shaft sections comprising a driving gear, a bearing-supporting structure associated with the shaft sections and having a finished opening adjacent the driving gear, a driving pinion meshing with said driving gear, a bearing for supporting the inner end of said driving pinion, a bearing cup supporting said bearing and provided near its outer end with a finished portion fitting the opening in the casing, and a radial flange flanking said finished portion, said flange being finished upon both faces and in its interior at the outer end of the cup, the inner face of the flange fitting the surface surrounding the opening to the casing, a second bearing supporting the pinion at its outer end, and a bearing cup for said second bearing, said bearing cup having a finished portion fitting the interior of the outer end of the first cup and also having a radial flange fitted upon its inner surface to mate with the outer finished surface of the flange of the first cup.

8. A driving structure for automobiles comprising a pair of shaft sections, an intermediate driving connection between said shaft sections comprising a driving gear, a bearing-supporting structure associated with the shaft sections and having a finished opening adjacent the driving gear, a driving pinion meshing with said driving gear, a bearing for supporting the inner end of said driving pinion, a bearing cup supporting said bearing and provided near its outer end with a finished portion fitting the opening in the casing, and a radial flange flanking said finished portion, said flange being finished upon both faces and in its interior at the outer end of the cup, the inner face of the flange fitting the surface surrounding the opening to the casing, a second bearing supporting the pinion at its outer end, a bearing cup for said second bearing, said bearing cup having a finished portion fitting the interior of the outer end of the first cup and also having a radial flange fitted upon its inner surface to mate with the outer finished surface of the flange of the first cup, and a single series of bolts clamping the two cups and supporting structure together.

In witness whereof, I have hereunto set my hand and seal at Indianapolis, Indiana, this 28th day of May, A. D. one thousand nine hundred and seven.

GEORGE A. WEIDELY. [L. S.]

Witnesses:
ARTHUR M. HOOD,
THOMAS W. McMEANS.